Nov. 2, 1926.

W. M. RISTAU, JR 1,605,780

CLUTCHING MECHANISM

Filed June 9, 1925

INVENTOR.
Wilhelm M. Ristau, Jr.,
BY
Geo. F. Kimmel ATTORNEY.

Patented Nov. 2, 1926.

1,605,780

UNITED STATES PATENT OFFICE.

WILHELM M. RISTAU, JR., OF FREDERICKSBURG, TEXAS.

CLUTCHING MECHANISM.

Application filed June 9, 1925. Serial No. 35,932.

This invention relates to a clutching mechanism designed primarily for use in connection with a dual ignition system for internal combustion engines as set forth in my application filed August 5, 1924, Serial Number 730,238, but it is to be understood that a clutching mechanism, in accordance with this invention can be employed in any connection for which it is found applicable, and the invention has for its object to provide, in a manner as hereinafter set forth, a mechanism of the class referred to, with means for gradually starting a magneto to overcome a sudden severe injurious shock thereto when coupled to its driving means, as well as preventing the stripping or injuring of the gears forming elements of the driving means for the magneto.

Further objects of the invention are to provide, in a manner as hereinafter set forth, a clutching mechanism for the purpose referred to, which is simple in its construction and arrangement, strong, durable, compact, thoroughly efficient and convenient in its use, readily installed with respect to the driving means for a pair of magnetos, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1:
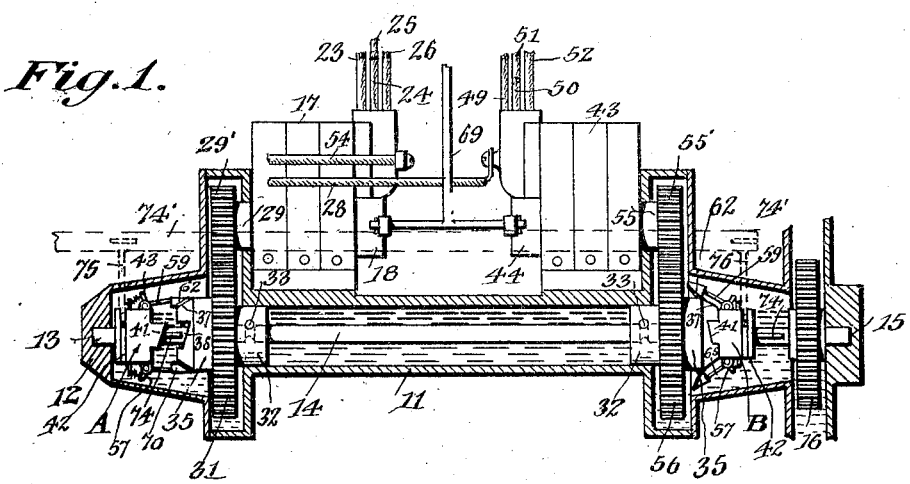
Figure 1 is a sectional elevation of a dual ignition system showing the adaptation therewith of a clutching mechanism in accordance with this invention.

Referring to the drawings in detail, 11 denotes a housing supported from an internal combustion motor, not shown. The housing 11 is closed at one end as indicated at 12, and said closed end provides a bearing 13 for a shaft 14, which is common to the operating means for the magnetos 17 and 43. The shaft 14 extends from the other end of the housing 11 and is mounted in a bearing 15. Between the bearing 15 and the housing 11, the shaft 14 is provided with a gear 16 having an operative connection with the motor.

The shafts of the magnetos 17, 43, are indicated respectively at 29, 55, which extend into the housing 11 and carry pinions 29', 55' respectively, driven from gears 31, 56 respectively loosely mounted on and adapted to be alternately clutched to the shaft 14 for alternately driving the magnetos. Each of the gears has its hub extended inwardly as at 32 and provided with a pin 33 travelling in a peripheral annular groove formed in the shaft 14, and by such arrangement, although the gears are loosely mounted on the shaft 14, they are prevented from shifting longitudinally with respect thereto. The hub of each of the gears is extended outwardly, as at 35, and such extended portion is of greater diameter than the portion 32 and formed with a socket 36, for the reception of a clutching protuberance to be presently referred to. The outer part of the extended portion 35 is tapered or bevelled, as at 37.

Circuit connections 23, 24, 25, 26 and 54 lead to the magneto 17 and circuit connections 28, 49, 50, 51 and 52 lead to the magneto 43. The magnetos 17 and 43 are provided with spark control devices 18 and 44 respectively. A controlling element, indicated at 69, is common to the spark controlling devices.

The construction as referred to, with the exception of the tapered or bevelled parts 37, is as disclosed in my application, Serial Number 730,238, and is illustrated by way of example so that the application of a clutching mechanism, in accordance with this invention, can be readily understood.

The clutching mechanism comprises a pair of units and so set up with relation to the gears 31, 56, that when one magneto is operated the other is idle, due to the arrangement of the units, as when one of the latter is active the other is inactive. The pair of units are oppositely disposed with respect to each other and are slidably mounted on the shaft 14, as well as rotatable bodily therewith. The pair of units are connected together by a shifting mechanism common to both units and said mechanism is so arranged with respect to the pair of units, that when one of the latter is shifted to active position, the other is simultaneously moved to inactive position.

As each of the units of the clutching mechanism is of the same construction, but one will be described, as the description of one will apply to the other. One of the units is indicated generally at A and the other at B. Each of the units includes a shiftable collar 40 of a diameter the same as the diameter at the free end of the portion 35 of a gear 31 or 56. Formed integral with the inner side of the collar 40, is a clutching protuberance 41 engaging in the socket 36 for clutching the gear 31 or 56 to the shaft 14. The collar 40, near its outer side is provided with an annular groove 42 in its periphery. Projecting laterally from the collar 40, at diametrically opposite points, is a pair of eyes 43′, 44′, through which extends a pair of slidable combined guide and connecting bars 45, 46, having curved outer ends 47, 48 respectively for connection with the eyes 43′, 44′. The bars 45, 46 extend towards the inner side of the collar 40, but at an outward inclination with respect thereto.

Projecting laterally from the collar 40, at diametrically opposite points and in proximity to the inner side of said collar, is a pair of apertured ears 49, 50 to which is pivotally connected, as at 51′, 52′, respectively, a pair of bell crank levers 55, 57. The arms of the lever 55 are indicated at 58, 59. The arm 58 is of less length than the arm 59 and has its outer end pivotally connected as at 60, to the upper or rear end of the bar 45. The arm 58 extends towards the eye 43′, at an inclination and bearing against the outer end of the arm 58 is a coiled spring 61 carried by the bar 45. The spring 61 is interposed between the eye 43′ and the upper end of the arm 58 and it normally acts to shift the arm 59 inwardly towards the shaft 14. The arm 59 projects rearwardly from the inner side of the collar 40 and terminates in a triangular shaped clutch shoe 62 having its inner face provided with a lining 63, of canvas or other suitable material, to set up a gripping or clutching action on the bevelled part 37 of the portion 35 of the hub of a gear 31 or 56, when the collar is shifted towards a gear. The shoe 62 is clear of the bevelled part 37 when the unit is in inactive position.

The arms of the lever 57 are indicated at 64, 65, and the arm 64 is of less length than the arm 65 and has its outer end pivotally connected, as at 66, to the upper or rear end of the bar 46. The arm 64 extends towards the eye 44′ at an inclination, and bearing against the outer end of the arm 64 is a coiled spring 67 carried by the bar 46. The spring 67 is interposed between the eye 44′ and the outer end of the arm 64 and it normally acts to shift the arm 65 inwardly towards the shaft 14. The arm 65 projects rearwardly from the inner side of the collar 40 and terminates in a triangular shaped clutch shoe 70 having its inner face provided with a lining 71 of canvas or other material to set up a gripping or clutching action on the bevelled part 37 of the portion 35 of the hub of a gear 31 or 56 when the collar is shifted towards a gear. The shoe 70 is clear of the bevelled part when the unit is in inactive position.

The shoe 62 has the inner corner, at its outer end rounded, as at 72, and the shoe 70 has its inner corner, at its outer end rounded, as at 73.

The collar 40 is slidably keyed to the shaft 14, as at 74, whereby the collar will be bodily carried with the shaft 14 during the operation thereof, but when desired the collar 40 can be shifted towards the part 37 of the portion 35 of the hub of a gear for the purpose of clutching the gear to the shaft 14.

When a unit of the clutching mechanism is in inactive position, the clutch shoes 62 and 70 oppose the bevelled part 37 of the portion 35 of the hub of a gear, but are spaced therefrom, due to the fact that the elongated arms of the bell cranks extend at an outward inclination with respect to the axis of the shaft 14, and furthermore the springs carried by the bars 45 and 46 do not force the shoes to gripping position with respect to the part 37. When a unit is in inactive position, the shoes oppose the part 37 of the hub, see Figure 2.

Figure 2:
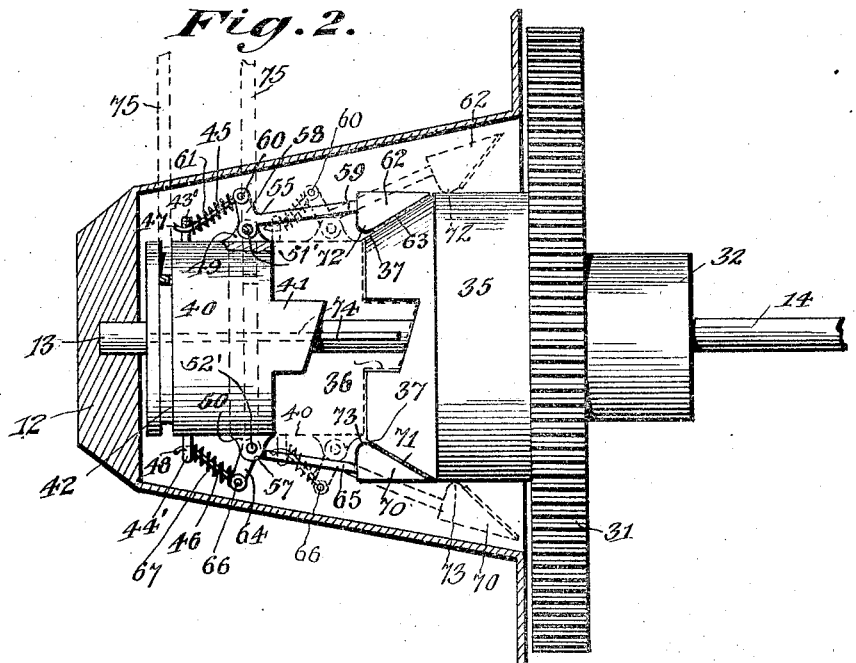
Figure 2 is a fragmentary view upon an enlarged scale and in sectional elevation illustrating one of the clutching units.

When a unit is in active position, that is to say with the protuberance 37 positioned within the socket 36, the clutch shoes 62 and 70 are in the dotted line position shown in Figure 2 and with the rounded corners 72, 73 of such clutch shoes positioned on the high part of the portion 35 of the hub of a gear.

The shifting mechanism for the clutching mechanism, as before stated, is designed to shift one unit to active position while simultaneously removing the other unit from active position, and as shown in Figure 1 of the drawings, unit A is in inactive position and unit B in active position. The shifting mechanism comprises a shifter rod 74′ provided with a pair of shifting arms 75, 76, the former engaging in the peripheral groove 42 of the collar 40 of the unit A and the latter engaging in the groove 42 of the collar 40 of unit B.

When one of the units is shifted to active position, the clutch shoes 62 and 70 will grip the bevelled part 37 and move up thereon until the clutch shoes clear said part 37 and have their rounded corners seated on the high part of the portion 35 of the hub, and at this time the protuberance 41 will engage in the socket 36 and clutch the gear to the shaft 14. As the clutch shoes 62 and 70 move over the bevelled part 37, a clutching action will take place, causing a gradual movement of the magneto until the protuberance 41 is seated in the socket 36, then a full drive will be obtained. The action of the clutch shoes 62 and 70 will prevent a severe shock being given to the magneto during the clutching operation, or in other words the arrangement of the clutch unit and its operation is such as to provide means for gradually starting a magneto to overcome a sudden severe injurious shock thereto when coupled to its driving means, as well as preventing the stripping or injuring of the gears forming elements of the driving means for the magneto.

It is thought that the many advantages of a clutching mechanism, in accordance with this invention, for a dual igniting system, can be readily understood, and although the preferred embodiment of the invention is as illustrated and described, yet it is to be understood that changes in the details of construction can be had which will fall within the scope of the invention as claimed.

What I claim is:—

1. In a clutching mechanism for the purpose set forth, the combination with a driving element, and a driven element provided with a bevelled part formed with a socket, of a clutch unit associating with said elements and comprising a shiftable collar carried by the driving element and provided with a clutching protuberance engageable in the socket for clutching the driven element to the driving element, and a pair of spring controlled clutch shoes pivotally connected with the collar and coacting with the bevelled part for clutching the driven element with the driving element prior to the engagement of the clutching protuberance in a socket.

2. In a clutching mechanism for the purpose set forth, the combination with a driving element, and a driven element provided with a bevelled part formed with a socket, of a clutch unit associating with said elements and comprising a shiftable collar carried by the driving element and provided with a clutching protuberance engageable in the socket for clutching the driven element to the driving element, and a pair of spring controlled clutch shoes pivotally connected with the collar and coacting with the bevelled part for clutching the driven element with the driving element prior to the engagement of the clutching protuberance in the socket, each of said clutch shoes of triangular contour and having its inner face provided with a gripping lining and further having the inner corner at its outer end rounded.

3. In a clutching mechanism for the purpose set forth the combination with a driven element, of a shiftable collar opposing one end of said element and provided with a clutching protuberance for engagement with said element when the collar is shifted in one direction, a pair of spring controlled bell crank levers pivotally connected to said collar at diametrically opposite points thereof and each having one of its arms extending inwardly from the collar and terminating in a clutching shoe for frictionally clutching the outer periphery of the driven element in advance of the clutching of said element by said protuberance.

4. In a clutching mechanism for the purpose set forth, the combination with a driven element formed with a bevelled part on its outer periphery and a socket in said bevelled part, of a shiftable collar opposing one end of said driven element and provided with a clutching protuberance engaging in said socket for coupling the driven element to a driving element, a pair of spring controlled bell crank levers pivotally connected to said collar and each having one of its arms extended inwardly from the collar and terminating in a clutching shoe engageable with said bevelled part for clutching the driven element to the driving element in advance of the clutching of the driven element by said protuberance.

In testimony whereof, I affix my signature hereto.

WILHELM M. RISTAU, Jr.